Patented Oct. 26, 1954

2,692,824

UNITED STATES PATENT OFFICE 2,692,824

SIZING PAPER PULP

Clifford J. Yarber, Holyoke, Mass., assignor to A. M. Meincke & Son, Inc., a corporation of Illinois No Drawing. Application September 28, 1949, Serial No. 118,479

1 Claim. (Cl. 92—21)

This invention relates to a method of treating paper, and more particularly to a method of preparing paper in which a cold swelling starch is employed as a size.

I have discovered that by careful control and proper selection of an acidizing medium, a greatly improved cold swelling starch can be produced, particularly for paper making purposes.

My preferred acidizing medium is an acid salt such as monosodium phosphate, which is in itself a buffering agent capable of holding a fairly steady pH. The amount added is sufficient to give a pH of approximately 6.2 to the mixture of water and potato starch prior to conversion. It is desirable not to go substantially below 5.2 pH or above approximately 6.5 pH.

Following adjustment of the pH as described, the starch is converted by heating suddenly above the boiling point under mechanical pressure, which squeezes it into thin layers. When these layers are dry, they are ground into the proper state of division.

The resulting material is of great value in the preparation of paper, particularly when employed as an engine size by incorporation in the beaters. It produces a paper which gives lower ink penetration, is less fuzzy, has a fold which is better than the same product treated with corn starch. It likewise has an improved Mullen. These improvements are found to take place as compared to the use of cold swelling starch as a size, even in considerably greater quantities. The ordinary alkalized cold swelling starch showed no improvement as compared to the untreated paper in similar tests.

Desirable results have also been obtained by employing the acidized, converted cold swelling starch in combination with corn starch or other sizing materials. For example, a mixture of 3% corn starch and 1% of the acidized cold swelling starch has proved extremely satisfactory.

In incorporating the material in the paper the ordinary beater practice is preferably altered. Ordinary beater furnish has a pH of about 4.5 to 5. In preparing paper with the improved material, this stock is treated with rosin to bring the pH to about 8, and is then brought back down again with alum to approximately the pH of the acidized cold swelling starch. For example, it is brought down to 6.2 pH. At this stage the acidized cold swelling starch is added, hydration is continued for about fifteen minutes, and then the pH is brought down to about 4.5 to 5 with alum.

The amount of the improved acidized cold swelling starch to be employed will vary. Normally less than 5% is employed, and preferably only about 1%. However, as pointed out, it may be desirable to use a mixture of starches as, for example, 1% of the acidized cold swelling starch and 3% of corn starch.

The foregoing detailed description is given for clearness of understanding only, and no unnecessary limitations should be understood therefrom, as modifications will be obvious to those skilled in the art.

I claim:

The process which comprises adding resin to an aqueous suspension of paper pulp fibers in sufficient amount to produce a pH of about 9; introducing to the aqueous suspension from about 1% to 5% of a cold swelling starch containing an acidizing medium present therein prior to conversion from raw starch to cold swelling starch, in sufficient amount to produce a pH of about 5.2 to 6.5 in the cold swelling starch, such introduction to the aqueous suspension of paper pulp being made at a time when the pH thereof has been reduced from about 9 to substantially the pH of the cold swelling starch by the addition of a sufficient amount of alum; reducing the pH of the aqueous suspension containing the cold swelling starch to about 4.5 to 5; and then forming the paper.

References Cited in the file of this patent

UNITED STATES PATENTS

| Number | Name | Date |
|---|---|---|
| 1,977,574 | Corson | Oct. 16, 1934 |
| 2,214,018 | Gill | Sept. 10, 1940 |
| 2,239,814 | Edson et al. | Apr. 29, 1941 |
| 2,337,458 | Edson et al. | Dec. 21, 1943 |
| 2,337,459 | Edson et al. | Dec. 21, 1943 |
| 2,410,357 | Pattilloch | Oct. 29, 1946 |
| 2,590,912 | Yarber | Apr. 1, 1952 |

FOREIGN PATENTS

| Number | Country | Date |
|---|---|---|
| 414,576 | Great Britain | Aug. 9, 1934 |

OTHER REFERENCES

Modern Pulp and Paper Making, by Witham, published by Reinhold Publishing Corp., New York, 2nd ed., pp. 339 and 340 (1942).

Casey, Paper Ind. & Paper World, May 1944, page 158.

Traquair, Paper, Mar. 24, 1920, pages 11–13.